US008477373B2

(12) United States Patent
Kouguchi

(10) Patent No.: US 8,477,373 B2
(45) Date of Patent: Jul. 2, 2013

(54) IMAGE PROCESSING SYSTEM, IMAGE PROCESSING APPARATUS, IMAGE FORMING APPARATUS AND COMPUTER-READABLE STORAGE MEDIUM

(75) Inventor: Masatsugu Kouguchi, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 497 days.

(21) Appl. No.: 12/791,175

(22) Filed: Jun. 1, 2010

(65) Prior Publication Data
US 2010/0302568 A1 Dec. 2, 2010

(30) Foreign Application Priority Data

Jun. 1, 2009 (JP) ................................. 2009-131898

(51) Int. Cl.
*G06K 1/00* (2006.01)
*G03F 3/08* (2006.01)
(52) U.S. Cl.
USPC .......................................... 358/1.9; 358/519
(58) Field of Classification Search
USPC .................. 358/448, 1.9, 500, 501, 515, 517, 358/518, 519
See application file for complete search history.

(56) References Cited

U.S. PATENT DOCUMENTS

| 6,978,045 B1 * | 12/2005 | Hashimoto et al. ........... 382/199 |
| 2006/0119907 A1 * | 6/2006 | Takahashi ..................... 358/504 |
| 2010/0265549 A1 * | 10/2010 | Kashibuchi et al. ......... 358/3.06 |
| 2011/0194862 A1 * | 8/2011 | Shindo ........................... 399/27 |

FOREIGN PATENT DOCUMENTS

| JP | 9-193477 A | 7/1997 |
| JP | 2005-348108 | 12/2005 |
| JP | 2006-082482 A | 3/2006 |
| JP | 2006-264158 A | 10/2006 |

OTHER PUBLICATIONS

Office Action (Decision of Refusal) dated Mar. 15, 2011, issued in the corresponding Japanese Patent Application No. 2009-131898, and an English Translation thereof.
Office Action from Japanese Patent Office issued in corresponding Japanese Patent Application No. 2009-131898 dated Dec. 21, 2010, and an English translation thereof.

* cited by examiner

*Primary Examiner* — Jerome Grant, II
(74) *Attorney, Agent, or Firm* — Buchanan Ingersoll & Rooney PC

(57) ABSTRACT

Disclosed is an image processing system, comprising: an image processing apparatus to output image data based on an input of a print job; and an image forming apparatus to form an image based on the image data, wherein the image processing apparatus comprises a first control section to output color adjustment data so as to perform a gamma adjustment for the image data, and wherein the image forming apparatus comprises an adjustment section to perform the gamma adjustment for the image data based on the input color adjustment data.

19 Claims, 13 Drawing Sheets

FIG.3

| ITEM | PARAMETER |
|---|---|
| NUMBER OF COPIES | 1 |
| SINGLE-SIDED OR DOUBLE-SIDED | SINGLE-SIDED |
| STAPLE | ONCE AT LEFT |
| . | . |
| . | . |
| . | . |
| COLOR ADJUSTMENT | PERFORM |
| COLOR ADJUSTMENT DATA | DATA OF 256 TONES FOR EACH OF C, M, Y AND K |

FIG.10

| ITEM | PARAMETER |
|---|---|
| NUMBER OF COPIES | 1 |
| SINGLE-SIDED OR DOUBLE-SIDED | SINGLE-SIDED |
| STAPLE | ONCE AT LEFT |
| . | . |
| . | . |
| . | . |
| COLOR ADJUSTMENT | PERFORM |
| COLOR ADJUSTMENT DATA 1 | DATA OF 256 TONES FOR EACH OF C, M, Y AND K |
| COLOR ADJUSTMENT DATA 2 | DATA OF 256 TONES FOR EACH OF C, M, Y AND K |
| COLOR ADJUSTMENT DATA 3 | DATA OF 256 TONES FOR EACH OF C, M, Y AND K |
| . | . |
| . | . |
| . | . |

*FIG.13*

| COLOR ADJUSTMENT DATA NAME | COLOR ADJUSTMENT DATA |
|---|---|
| ADJUST 1 | 256 OUTPUT / INPUT 256 |
| ADJUST 2 | 256 OUTPUT / INPUT 256 |
| ⋮ | ⋮ |

IMAGE PROCESSING SYSTEM, IMAGE PROCESSING APPARATUS, IMAGE FORMING APPARATUS AND COMPUTER-READABLE STORAGE MEDIUM

CROSS-REFERENCE TO RELATED APPLICATION

The present U.S. patent application claims a priority under the Paris Convention of Japanese patent application No. 2009-131898 filed on Jun. 1, 2009, which shall be a basis of correction of an incorrect translation.

BACKGROUND OF THE INVENTION

1. Field of the Invention

The present invention relates to an image processing system, an image processing apparatus, an image forming apparatus, and a computer-readable storage medium.

2. Description of Related Art

There has been a method of providing an image processing apparatus, such as a print controller, between a printer and equipment (e.g. a personal computer (PC), a portable terminal, or the like) to output an instruction (print job) for making the printer perform an image formation, when the image formation is performed by an image forming apparatus, such as the printer. When the print controller receives the input of a print job, the print controller performs rasterizing processing to generate image data of a bit map, or the like, on the basis of the page description language (hereinafter referred to as "PDL") included in the print job, and outputs the generated image data. The printer forms an image on the basis of the image data input from the print controller.

FIG. 12 is an explanatory diagram showing an example of the configuration of a print job.

The print job of the present example comprises a printer job language (PJL) and a PDL.

The PJL is the information to describe instructions pertaining to an image formation in a command format. As one of the contents determined by a PJL command, a content pertaining to the color adjustment data to be applied to the image data generated by a PDL may be cited.

FIG. 13 is a diagram showing an example of the color adjustment data.

Each piece of the color adjustment data shown in FIG. 13 includes four sets of gamma conversion tables, each showing a relationship between input tone values and output tone values, and each set corresponds to each color of cyan (C), magenta (M), yellow (Y), and black (K), respectively.

Each of the gamma conversion tables shown in FIG. 13 shows the relationship between input and output tones of each color of 256 tones, i.e. 8 [bits] colors.

As shown in FIG. 13, each of the gamma conversion tables of each set is the data capable of being expressed by an independent gamma characteristic curve for each color, and the locus of each gamma characteristic curve corresponds to gamma values of each color.

The gamma values are the values indicating the intensities in each gamma characteristic curve. When the gamma values are plus, a curve (for example, the uppermost curve of those in ADJUST2 shown in FIG. 13) is shown in which the output tone values (on each ordinate axis shown in FIG. 13) are relatively larger than the input tone values (on each abscissa axis shown in FIG. 13). On the other hand, when the gamma values are minus, a curve (for example, any one of the curves in ADJUST1 shown in FIG. 13) is shown in which the output tone values are relatively smaller than the input tone values. Moreover, the size of each of the curves changes according to the magnitude of the absolute value of each of the gamma values. The smaller the absolute value of each of the gamma values is, the smaller each of the differences between the input tone values and the output tone values is, which makes the curves smaller. The larger the absolute value of each of the gamma values is, the larger each of the differences between the input tone values and the output tone values is, which makes the curves larger.

As shown in FIG. 13, a color adjustment data name is given to each piece of color adjustment data, and, for example, the description of "@PJL SET COLORADJUST=ADJUST1" shown in FIG. 12 indicates that the color adjustment data having the color adjustment data name of "ADJUST1" shown in FIG. 13 is applied.

As shown in FIG. 13, the adjustments of colors based on color adjustment data are the processing in which each color of cyan (C), magenta (M), yellow (Y), and black (K) is independently subjected to a tone adjustment, and are different from the processing pertaining to a color space conversion by the application of an ICC profile, or the like.

The PDL is a command to instruct the print controller to render an image. The print controller interprets the content of a PDL command and performs rasterizing processing to generate image data.

Conventionally, print controllers have generated image data that had already been subjected to a gamma adjustment by the use of color adjustment data at the time of performing rasterizing processing. That is, the image data generated by the conventional print controllers only includes color information in a state where the gamma adjustment based on the color adjustment data has already been performed.

Accordingly, as described in, for example, Japanese Patent Application Laid-Open Publication No. 2006-82482, even when the rendering content given in the instruction by a PDL is the same as that of a prior print job, the print controller performs rasterizing processing again to generate new image data and inputs the generated new print data to a printer, in a case where the color adjustment data specified by a PJL is changed to newly perform printing (hereinafter referred to as "reprinting").

However, because the rasterizing processing is performed at each event of reprinting in which different color adjustment data is used when image data is generated by the conventional print controllers described above, the throughput of the print controller is obliged to be considerably spared for the reprinting based on the different color adjustment data. Further, the throughput capable of being assigned to the rasterizing processing based on the other print jobs is consequently decreased to deteriorate the responses of the print controller. Moreover, a configuration to perform gamma adjustment is sometimes provided in a printer to perform the gamma adjustment of image data input to the printer.

Here, when the image data in the state of being subjected to the application of gamma adjustment based on color adjustment data is generated at the time of performing rasterizing processing, the color information of the image data before the gamma adjustment based on the color adjustment data, that is, the tone information of the image data in the state where no gamma adjustment based on the color adjustment data is added (hereinafter sometimes referred to as "original tone information") is lost.

Consequently, when the image data in the state of being subjected to the application of a gamma adjustment based on color adjustment data is generated at the time of performing rasterizing processing, the gamma adjustment in a printer happens to be performed for the image data which has already been performed with the gamma adjustment based on the color adjustment data, and consequently the gamma adjustment for the original tone information cannot be performed. That is, it is resulted in that the image data after the color adjustment based on the color adjustment data is further subjected to a color adjustment, thereby the accuracy of color reproduction based on the original tone information is reduced.

SUMMARY OF THE INVENTION

The present invention was made in consideration of the resources situation mentioned above, and aims to decrease the consumption of the resources pertaining to reprinting and the lowering the accuracy of color reproduction.

To achieve at least one of the abovementioned objects, an image processing system reflecting one aspect of the present invention comprises:

an image processing apparatus to output image data based on an input of a print job; and an image forming apparatus to form an image based on the image data, wherein the image processing apparatus comprises a first control section to output color adjustment data so as to perform a gamma adjustment for the image data, and wherein the image forming apparatus comprises an adjustment section to perform the gamma adjustment for the image data based on the input color adjustment data.

Preferably, the image forming apparatus further comprises a first storage section to store the image data and the color adjustment data, wherein when an image formation is performed by using: the same image data as the image data stored in the first storage section; and a gamma value different from a gamma value applied to a prior image formation, the first control section outputs new color adjustment data corresponding to the different gamma value, and wherein the adjustment section performs the gamma adjustment for the image data stored in the first storage section based on the new color adjustment data.

Preferably, the first control section outputs a plurality of pieces of color adjustment data for one piece of the image data, and wherein the adjustment section performs the gamma adjustment for the image data based on each of the plurality of pieces of color adjustment data.

Preferably, the image forming apparatus further comprises a color adjustment data editing section to perform an editing of the color adjustment data, and wherein the adjustment section performs the gamma adjustment for the image data based on the color adjustment data edited by the color adjustment data editing section.

BRIEF DESCRIPTION OF THE DRAWINGS

The present invention will become more fully understood from the detailed description given hereinbelow and the appended drawings, and thus are not intended as a definition of the limits of the present invention, wherein;

FIG. 3 is a diagram showing an example of the configuration of ticket data;

FIG. 10 is a diagram showing an example of the configuration of ticket data which is added with a plurality of pieces of color adjustment data;

FIG. 13 is a diagram showing an example of the color adjustment data.

DETAILED DESCRIPTION OF THE PREFERRED EMBODIMENTS

In the following, the embodiments of the present invention will be described in detail with reference to the drawings.

Figure 1:
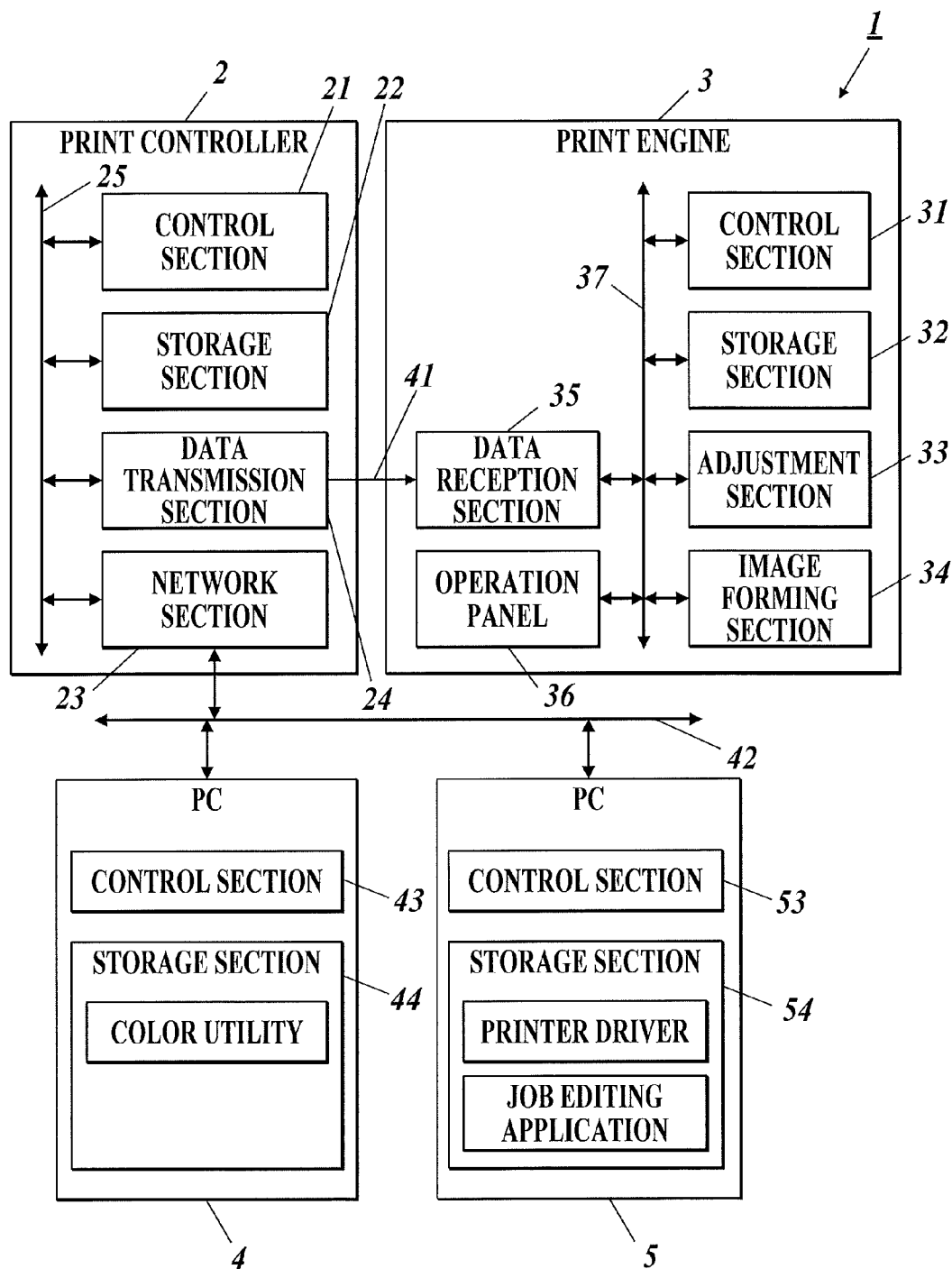
FIG. 1 is a block diagram showing the principal configuration of the image processing system according to the present embodiment.

FIG. 1 is a block diagram showing the principal configuration of an image processing system 1 according to the present embodiment.

The image processing system 1 includes a print controller 2, a print engine 3, and PCs 4 and 5.

The print controller 2 functions as an image processing apparatus to generate image data on the basis of an input of a print job, and to input the generated image data to the print engine 3.

The print controller 2 includes a control section 21, a storage section 22, a network section 23, and a data transmission section 24, and each section of the print controller 2 is connected to one another through a bus 25.

The control section 21 controls the operation of each section in the print controller 2. The control section 21 of the present embodiment includes a central processing unit (CPU), a random access memory (RAM), and a read only memory (ROM). The CPU reads out programs, data, and the like, in the RAM according to the processing content from the ROM, to execute or process the read out programs and data, thereby various kinds of processing is performed. The generation processing of image data based on an input of print job and the input processing of the image data to the print engine 3 are both performed by the control section 21.

The storage section 22 functions as a storage region capable of storing various programs, data, and the like. The storage section 22 stores color adjustment data including a gamma conversion table for each color of C, M, Y, and K. The storage section 22 stores a plurality of pieces of color adjustment data. These pieces of color adjustment data are different from one another, and the gamma conversion table of at least one color of the C, M, Y, and K is different from the other gamma conversion tables.

The network section 23 functions as a communication apparatus to perform communication between external equipment, such as the PCs 4 and 5, and the print controller 2.

The network section 23 is, for example, a network interface card (NIC), and enables data transfers between the print controller 2 and the external equipment, such as the PCs 4 and 5, through a wired or wireless communication line 42.

The data transmission section 24 functions as a dedicated interface to transmit data from the print controller 2 to the print engine 3.

The print engine 3 functions as an image forming apparatus to form an image on the basis of the image data input from the print controller 2.

The print engine 3 includes a control section 31, a storage section 32, an adjustment section 33, an image forming section 34, a data reception section 35, and an operation panel 36, and each section of the print engine 3 is connected to one another through a bus 37.

The control section 31 controls the operation of each section of the print engine 3. The control section 31 of the present embodiment includes a CPU, a RAM, and a ROM. The CPU reads out programs, data, and the like, in the RAM according to the processing content from the ROM, to execute or process the read out programs and data, thereby various kinds of processing is performed.

The storage section 32 functions as a storage region capable of storing various programs, data, and the like. The storage section 32 stores the image data and the color adjustment data input from the print controller 2.

The storage section 32 stores correction data.

The correction data is the data indicating the gamma conversion table of each color of cyan (C), magenta (M), yellow (Y), and black (K) similarly to the color adjustment data, and is to be used when the color adjustment of image data is performed. The correction data is the data indicating a gamma conversion table of 256 tones for each color of C, M, Y, and K.

The correction data is the data to correct the unique gamma characteristic held by the print engine 3. For example, there may be the case where a difference is caused between the gamma characteristic of the color specified by print data input to the print engine 3 and the gamma characteristic at the time of image forming and outputting based on the coloring of the toner of each color used for the image formation by the print engine 3. This difference is corrected on the basis of the correction data so as to reproduce the gamma characteristic of the color specified by the input print data at the time of image formation.

The adjustment section 33 performs the color adjustment for image data. The color adjustment of the image data by the adjustment section 33 is the processing to perform the gamma adjustment for the image data based on both the color adjustment data and correction data, or based on only the correction data.

The image forming section 34 forms an image on a print medium, such as paper. In the following, the image formation by the image forming section 34 will be described as "printing."

The data reception section 35 functions as an interface to receive the data transmitted from the print controller 2. The data transmission section 24 and the data reception section 35 are connected to each other through a cable 41, and the like.

The operation panel 36 is a display inputting device having the function as a display section to display various kinds of information pertaining to the operation of the print engine 3, and the function as an operation section to perform various input instructions to the print engine 3.

The PCs 4 and 5 are external equipment to perform input to the print controller 2. Although the registration and editing of the color adjustment data by the print controller 2 are performed through the PC 4 and a print job is input through the PC 5 in the present embodiment, each function of the PCs 4 and 5 may alternatively be performed by a single PC.

The PC 4 includes at least a control section 43 and a storage section 44. The storage section 44 stores at least a color utility, and the control section 43 executes the color utility. The color utility is a program to perform the registration and editing of the color adjustment data.

The PC 5 includes at least a control section 53 and a storage section 54. The storage section 54 stores at least a printer driver and a job editing application, and the control section 53 executes the printer driver and the job editing application. The printer driver is a program to output a print job, and the job editing application is a program to edit a print job output in the past and the image data of which is stored in the print engine 3.

Next, the image forming processing by the image processing system 1 will be described.

Figure 2:
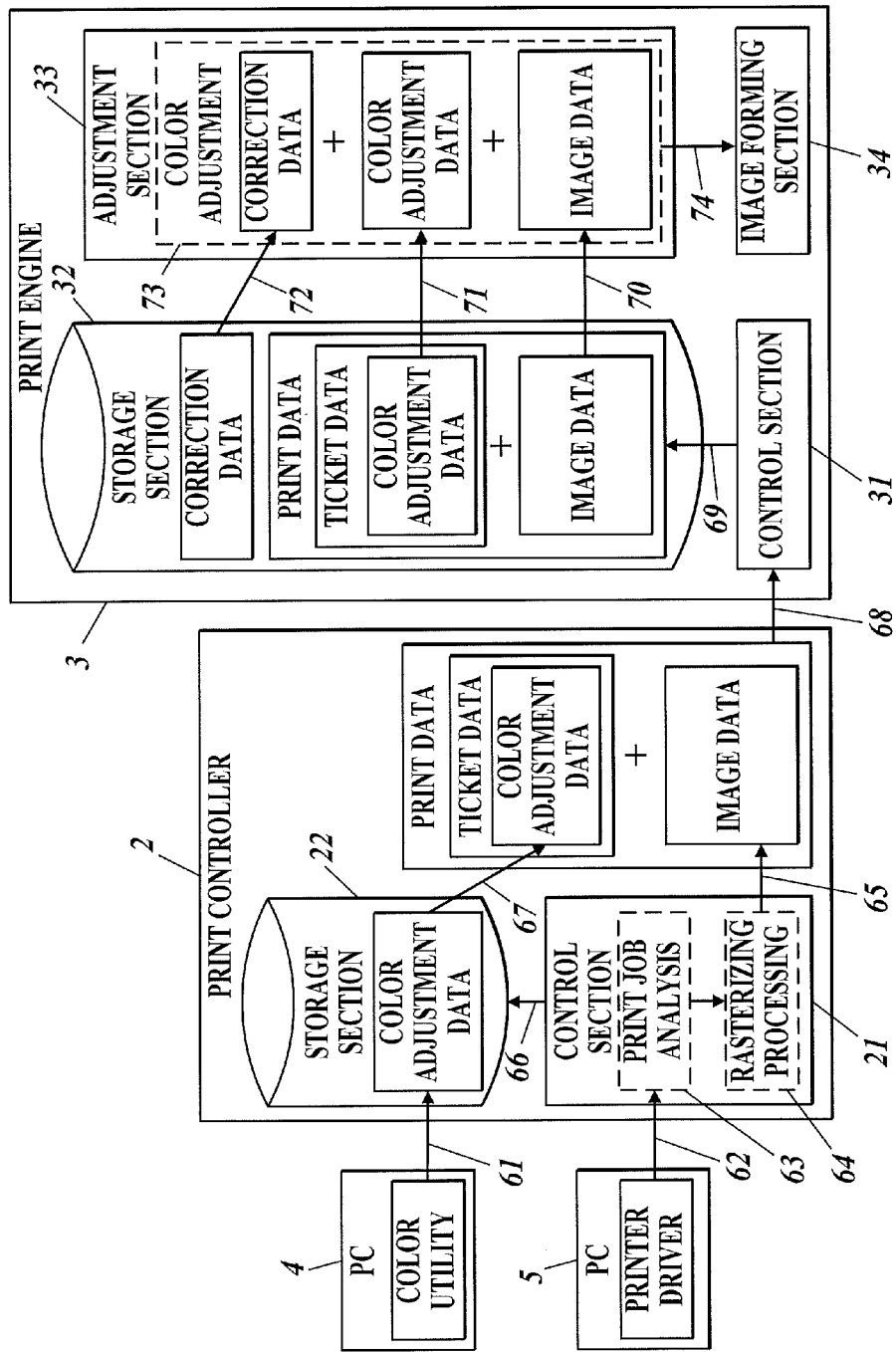
FIG. 2 is an explanatory diagram showing the outline of image forming processing by the image processing system.

FIG. 2 is an explanatory diagram showing the outline of the image forming processing by the image processing system 1.

A color utility is first executed by the PC 4, and the registration or editing of color adjustment data is performed for the print controller 2 through the execution of the color utility (arrow 61 in FIG. 2). The color adjustment data subjected to the registration or editing is stored in the storage section 22 of the print controller 2. The registration or editing of the color adjustment data has only to be performed before the input of a print job to the print controller 2, and the registration or the editing need not be performed at each input of a print job.

Next, a print job is input to the print controller 2 through the execution processing of the printer driver by the PC 5 (arrow 62 in FIG. 2). The print job is input to the control section 21 through the network section 23.

The control section 21 subjected to the input of the print job analyses the print job (block 63 in FIG. 2), and performs the rasterizing processing (block 64 in FIG. 2) to generate image data based on the PDL included in the print job (arrow 65 in FIG. 2). Even when the PJL command included in the print job comprises a content indicating that color adjustment data should be specified and applied in the rasterizing processing, the control section 21 generates image data without applying any color adjustment data thereto.

After the analysis of the print job, when the PJL command included in the print job comprises the content indicating that color adjustment data should be specified and applied, the control section 21 reads the color adjustment data specified by the PJL command (arrow 66 in FIG. 2), and adds the read color adjustment data to ticket data of the print job (arrow 67 in FIG. 2).

FIG. 3 is a diagram showing an example of the configuration of the ticket data.

The ticket data is the data including various items pertaining to image formation and parameters thereof. As the items included in the ticket data, for example, as shown in FIG. 3, the number of copies of the print media to be subjected to image formation by the print job ("NUMBER OF COPIES" in FIG. 3), whether the printing on both sides of the print media is performed or not ("SINGLE-SIDED OR DOUBLE-SIDED" in FIG. 3), and the information pertaining to staple processing ("STAPLE" in FIG. 3)b may be cited. The other various items pertaining to image formation may also be included in the ticket data.

The ticket data is input from the PC 5 to the print controller 2 together with the input of the print job.

As shown in FIG. 3, the information pertaining to color adjustment may be included as an item of the ticket data ("COLOR INFORMATION" in FIG. 3). Further, the color adjustment data to be used when the color adjustment is performed may also be added as one of the items ("COLOR ADJUSTMENT DATA" in FIG. 3). In such case, the print controller 2 adds the color adjustment data specified by the PJL to the ticket data.

Figure 13:
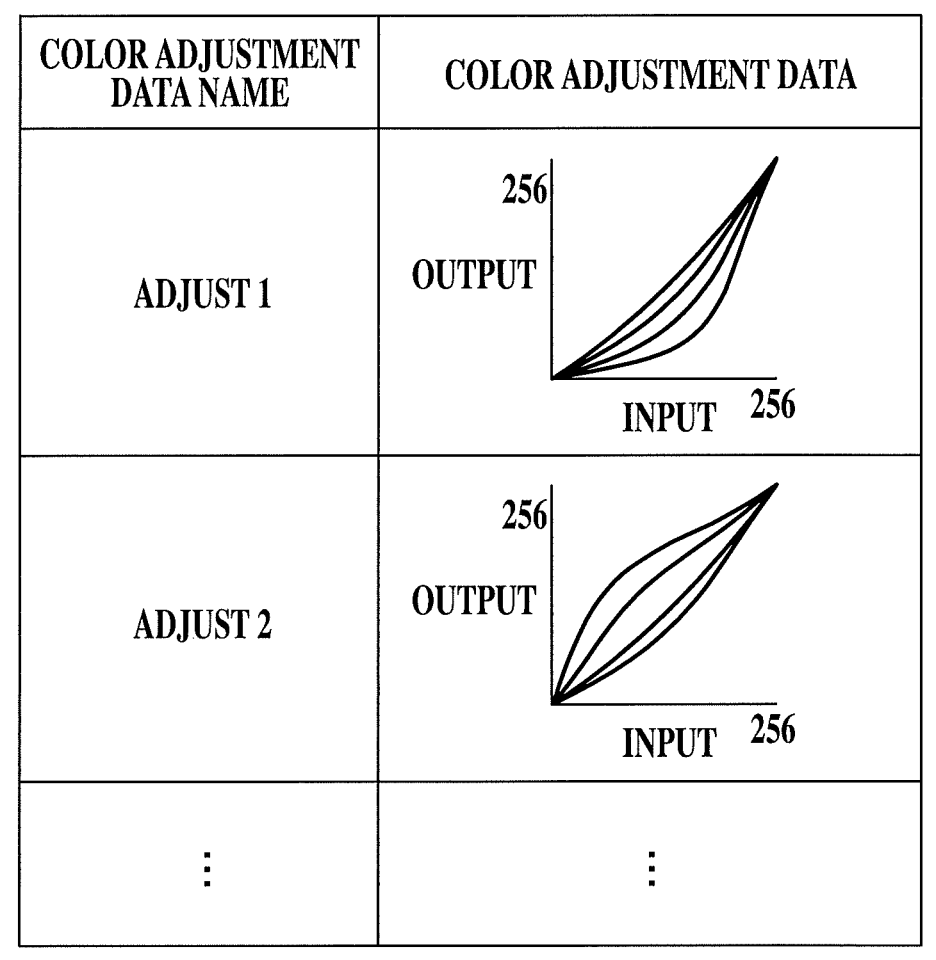

Although FIG. 3 shows the description of the character string "DATA OF 256 TONES FOR EACH OF C, M, Y AND K" as the parameters of "COLOR ADJUSTMENT DATA", the data indicating the gamma conversion table of 256 tones for each color of C, M, Y, and K shown in FIG. 13 is actually added as a parameter of "color tone data." That is, the CPU of the print engine 3 reads the parameter of the item "color tone data" included in the ticket data, and thereby the CPU obtains the data indicating the gamma conversion table of 256 tones for each color of C, M, Y, and K as shown in FIG. 13.

The control section 21 outputs the ticket data and the image data as print data through the data transmission section 24 (arrow 68 in FIG. 2).

When the PJL command included in a print job comprises the content indicating that color adjustment data should be specified and applied, the control section 21 adds the color adjustment data to the ticket data, and subsequently, the control section 21 outputs the ticket data and image data.

When the PJL command included in a print job does not comprise any content indicating that color adjustment data should be specified and applied, the control section 21 outputs the ticket data and image data through the data transmission section 24, without adding the color adjustment data to the ticket data.

The ticket data includes the information relating the ticket data to a print job or image data to which the ticket data is applied. The image data to be output through the data transmission section 24 is output together with the ticket data including the information relating the ticket data to the image data as print data.

When the print engine 3 receives the input of the image data and the ticket data as the print data, the print engine 3 performs the image formation based on the image data and the ticket data.

To put it concretely, the control section 31 first instructs the storage section 32 to store the input image data and ticket data (arrow 69 in FIG. 2). The control section 31 then instructs the adjustment section 33 to perform the color adjustment of the image data.

The adjustment section 33 reads the input image data therein (arrow 70 in FIG. 2). The adjustment section 33 then performs the application (arrow 71 in FIG. 2) of the color adjustment data added to the ticket data input together with the read image data and the application (arrow 72 in FIG. 2) of the correction data stored in the storage section 32 to the image data to perform the color adjustment of the image data (block 73 in FIG. 2). The image data after the reception of the color adjustment is output to the image forming section 34 (arrow 74 in FIG. 2). The image forming section 34 subjected to the input of the image data prints the image data.

The application of the color adjustment data shown by the arrow 71 in FIG. 2 is performed when the instruction of the color adjustment has been given by the ticket data, that is, when the item of the "COLOR ADJUSTMENT" of the ticket data shown in FIG. 3 is "PERFORM."

The processing at the time of applying both of the color adjustment data added to the ticket data and the correction data stored in the storage section 32 to image data is not limited to one method. For example, after the adjustment section 33 performs the color adjustment to apply either one of the color adjustment data or the correction data to the image data, the color adjustment of further applying the other to the image data which has already been subjected to one of them may be performed. Alternatively, the control section 31 may generate one piece of data (for example, a color adjustment table, or the like) to perform the color adjustment of the image data on the basis of the gamma conversion table of each color specified by each of the color adjustment data and the correction data, and the adjustment section 33 may perform the color adjustment on the basis of the one generated piece of data.

When the instruction of the color adjustment is not given by the ticket data, that is, when the item of "COLOR ADJUSTMENT" of the ticket data shown in FIG. 3 is "NOT PERFORM", the adjustment section 33 performs only the application of correction data to the image data to perform the color adjustment.

Next, the reprinting of the image processing system 1 will be described.

Figure 4:
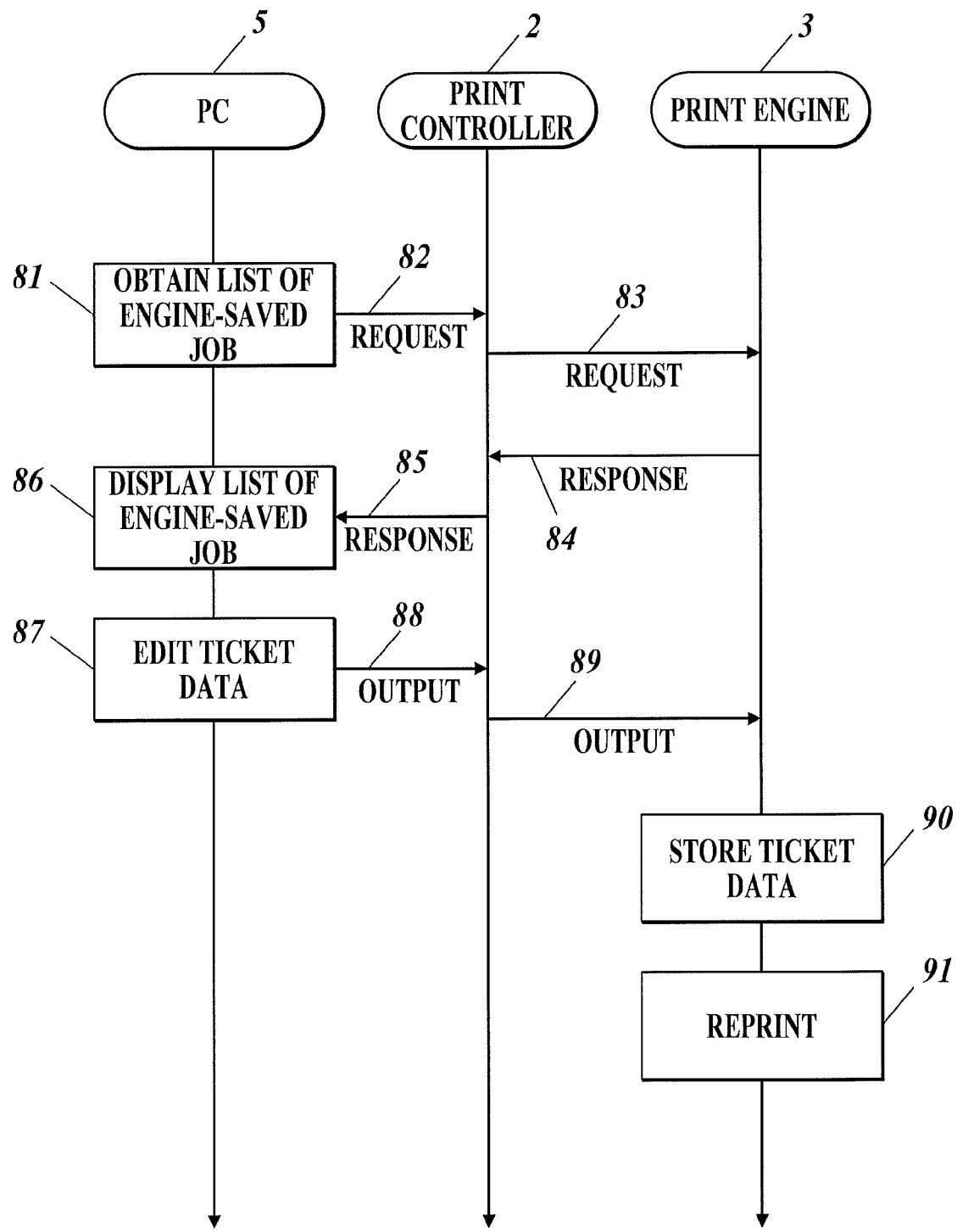
FIG. 4 is a sequence diagram showing the flow in the processing of the image processing system at the time of reprinting.

FIG. 4 is a sequence diagram showing the flow in the processing of the image processing system 1 at the time of the reprinting.

First, a list of an engine-saved job is obtained (block 81 in FIG. 4).

To put it concretely, the PC 5 performs (arrow 82 in FIG. 4) a list obtaining request of a print job (hereinafter sometimes referred to as "engine-saved job") saved in the print engine 3 to the print controller 2. The print controller 2 refers to the storage section 32 of the print engine 3 with regard to the image data stored therein, on the basis of the list obtaining request from the PC 5. To put it concretely, the print controller 2 requests the obtainment of the information of the image data and the ticket data held by the print engine 3 (arrow 83 in FIG. 4).

The print engine 3 outputs the information of the image data and the ticket data stored in the storage section 32 (arrow 84 in FIG. 4) to the print controller 2 as a response to the request by the print controller 2. Further, the print controller 2 outputs the information of the input image data and the ticket data (arrow 85 in FIG. 4) to the PC 5 as a response to the request by the PC 5. The PC 5 performs a list display of the engine-saved job on the basis of the input information of the image data and the ticket data (block 86 in FIG. 4).

Subsequently, the editing of the ticket data for the engine-saved job displayed on the basis of the input operation to the PC 5 is performed (block 87 in FIG. 4), and the ticket data after the editing is output to the print controller 2 (arrow 88 in FIG. 4). The print controller 2 outputs the ticket data after the editing from the PC 5 to the print engine 3 (arrow 89 in FIG. 4). The ticket data after the editing to be output from the PC 5 to the print engine 3 through the print controller 2 is not accompanied by any image data. The print engine 3 makes the storage section 32 store the input ticket data after the editing (block 90 in FIG. 4), and performs reprinting processing (block 91 in FIG. 4). In the reprinting processing, the print engine 3 reads out the image data related to the ticket data before the editing from the storage section 32, and performs the color adjustment for the read-out image data based on the ticket data after the editing, which has been received from the print controller 2.

The editing of the ticket data is the processing to change the parameters of the various items included in the ticket data. In the editing of the ticket data, a user may change the color adjustment data to be applied to image data.

Figure 5:
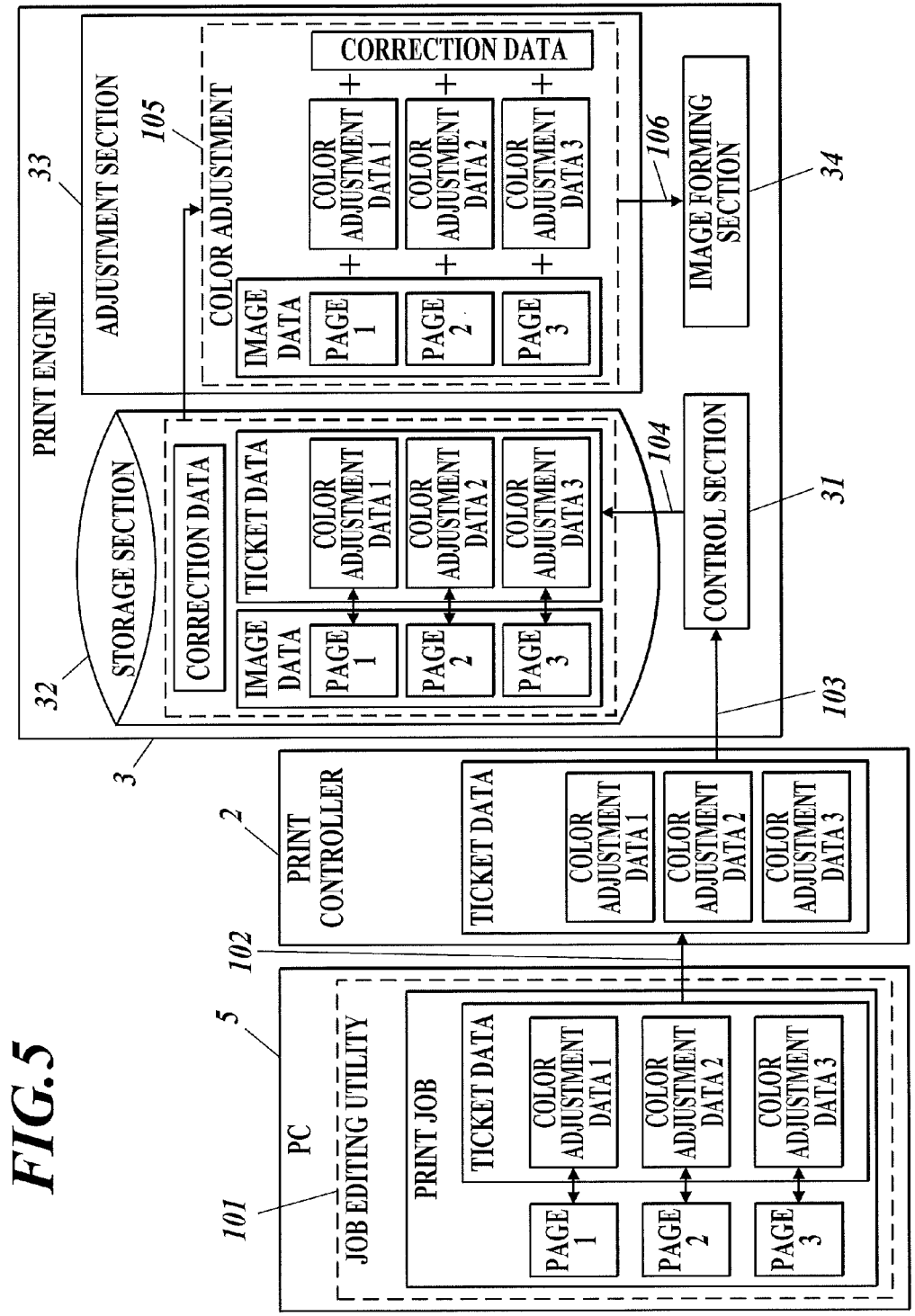
FIG. 5 is an explanatory diagram showing the flow of color adjustment data through the reprinting processing by the image processing system.

FIG. 5 is an explanatory diagram showing the flow of color adjustment data through the reprinting processing by the image processing system 1.

First, a job editing utility is executed in the PC 5 (block 101 in FIG. 5). The job editing utility is software to select any one of the engine-saved jobs so as to perform the editing of ticket data, and can perform the editing and the changing, such as the replacing, of the color adjustment data. When the color adjustment data is changed, the color adjustment data added as a parameter of the "COLOR ADJUSTMENT DATA" of ticket data is changed. After the change of the color adjustment data and the other various parameters of the various items through the job editing utility, the edited ticket data is output to the print controller 2 (arrow 102 in FIG. 5).

When the print controller 2 receives the input of the edited ticket data, the print controller 2 outputs the ticket data to the print engine 3 (arrow 103 in FIG. 5).

The print engine 3 which has received the input of the edited ticket data performs the image formation based on the edited ticket data and the image data related to the ticket data.

To put it concretely, the control section 31 first makes the storage section 32 store the edited ticket data (arrow 104 in FIG. 5). The control section 31 then makes the adjustment section 33 perform the color adjustment of the image data (block 105 in FIG. 5). The flow of the color adjustment by the adjustment section 33 is similar to the content shown in FIG. 2 and the description thereof. The image data after the color adjustment is output to the image forming section 34 (arrow 106 in FIG. 2). The image forming section 34 which has received the input of the image data prints the image data.

As shown in FIG. 5, the color adjustment data may be provided for each page of the image data individually. It is not limited to the case of reprinting but is also possible in the case of normal image formation shown in FIG. 2 to provide the color adjustment data for each page of the image data individually. In such a case, information indicating which color information data is to be applied to which page may be added to the ticket data.

Next, the editing of color adjustment data by the print engine 3 will be described.

The print engine 3 includes the function of editing the color adjustment data of the ticket data stored in the storage section 32. The editing of the color adjustment data of the ticket data, stored in the storage section 32 of the print engine 3 is performed through the operation panel 36.

Figure 6:
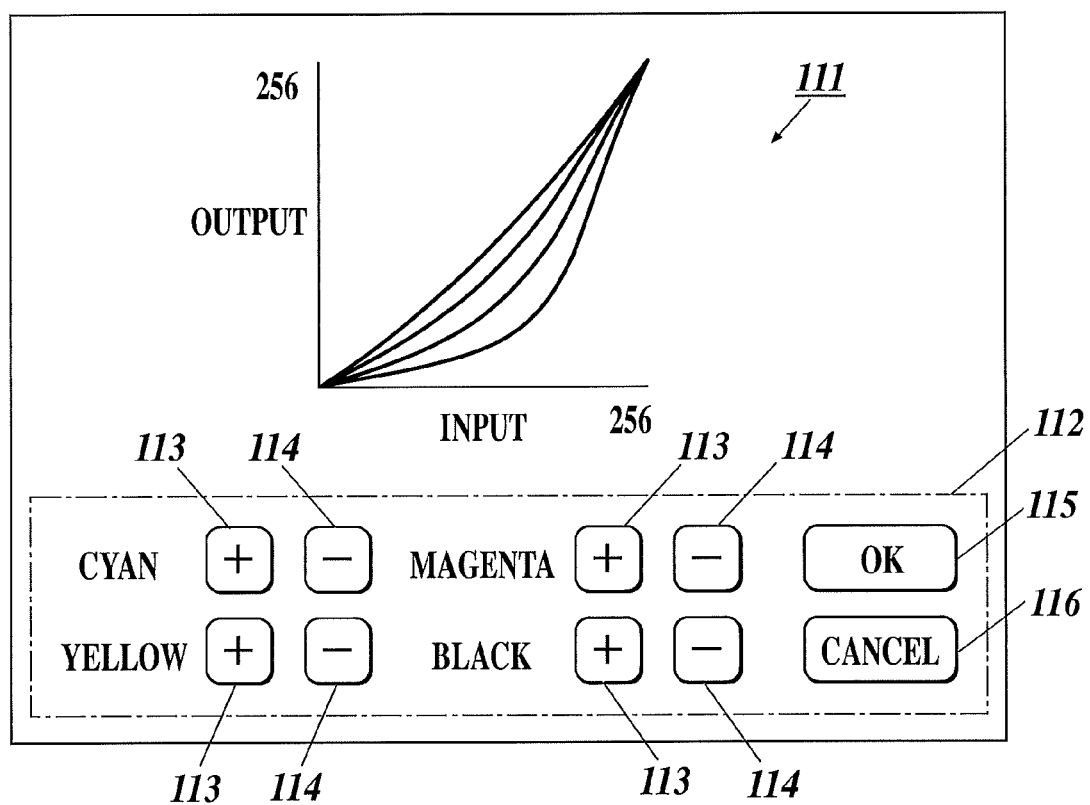
FIG. 6 is an explanatory diagram showing an example of a color adjustment data editing screen.

FIG. 6 is an explanatory diagram showing an example of a color adjustment data editing screen.

The color adjustment data editing screen shown in FIG. 6 is the display content displayed by the operation panel 36. As shown in FIG. 6, the color adjustment data editing screen includes a color adjustment data displaying section 111 to display the color adjustment data of an editing object, and an editing button displaying section 112 to perform the editing of a gamma value.

The editing button displaying section 112 includes plus buttons 113, minus buttons 114, an OK button 115, and a cancel button 116.

Each of the plus buttons 113 increases the gamma value of each of the colors included in color adjustment data. By increasing the gamma value, an adjustment to a direction in which the gamma characteristic curve becomes convex is added. Each of the minus buttons 114 decreases the gamma value of each of the colors included in color adjustment data. By decreasing the gamma value, an adjustment to a direction in which the gamma characteristic curve becomes concave is added. In the present embodiment, each of the plus buttons 113 and each of the minus buttons 114 are individually provided for each color of cyan (C), magenta (M), yellow (Y), and black (K). Each of the plus buttons 113 and the minus buttons 114 are respectively related to each of the colors described in FIG. 6 on the left side thereof, so that each of the plus buttons 113 and the minus buttons 114 increase and decrease the gamma value of the color related thereto. When an input operation to each of the plus buttons 113 or the minus buttons 114 is performed, the control section 31 performs display updating processing in which: the gamma characteristic curve of the color adjustment data displayed in the color adjustment data displaying section 111 is changed according to the content of the input operation; and the display content of the color adjustment data displaying section 111 is replaced with the color adjustment data reflecting the gamma characteristic curve which has been changed.

The OK button 115 is a button to perform the instruction input so as to save color adjustment data. When an input operation is performed to the OK button 115, the control section 31 performs the control of overwriting the color adjustment data reflecting the gamma characteristic curve whose content is displayed on the color adjustment data displaying section 111 on the color adjustment data of the editing object to save the overwritten color adjustment data. After a user edits the gamma values through the plus buttons 113 and the minus buttons 114, the user may operate the OK button 115 to save the color adjustment data after the editing.

The cancel button 116 cancels the editing of color adjustment data. When an input operation is performed to the cancel button 116, the control section 31 ends the display of the color adjustment data editing screen. At this time, even when the editing of color adjustment data is performed through the plus buttons 113 or the minus buttons 114, the control section 31 cancels the edited color adjustment data.

The selection operation input of color adjustment data of an editing object is performed through the operation panel 36.

When the instruction input of ticket data editing is performed through the operation panel 36 (ticket data editing instruction), the control section 31 makes the operation panel 36 display listing information (ticket data information) of the ticket data stored in the storage section 32. After that, when a selection input operation of the ticket data including the color adjustment data of an editing object among the ticket data displayed on the operation panel 36; and a selection input operation of the color adjustment data of an editing object are performed, the control section 31 makes the operation panel 36 display a color adjustment data editing screen in the state where the color adjustment data of the editing object is displayed in the color adjustment data displaying section 111.

After the editing of the color adjustment data with the operation panel 36 through the color adjustment data editing screen, the user may perform the instruction input operation of reprinting through the operation panel 36. The adjustment section 33 performs the color adjustment of the image data related to the ticket data to which the edited color adjustment data is added, on the basis of the edited color adjustment data and correction data, and outputs the image data after the color adjustment to the image forming section 34. The image forming section 34 prints the input image data.

Next, the flows of various kinds of processing by the image processing system 1 will be described with reference to the flow charts of FIGS. 7 to 9.

Figure 7:
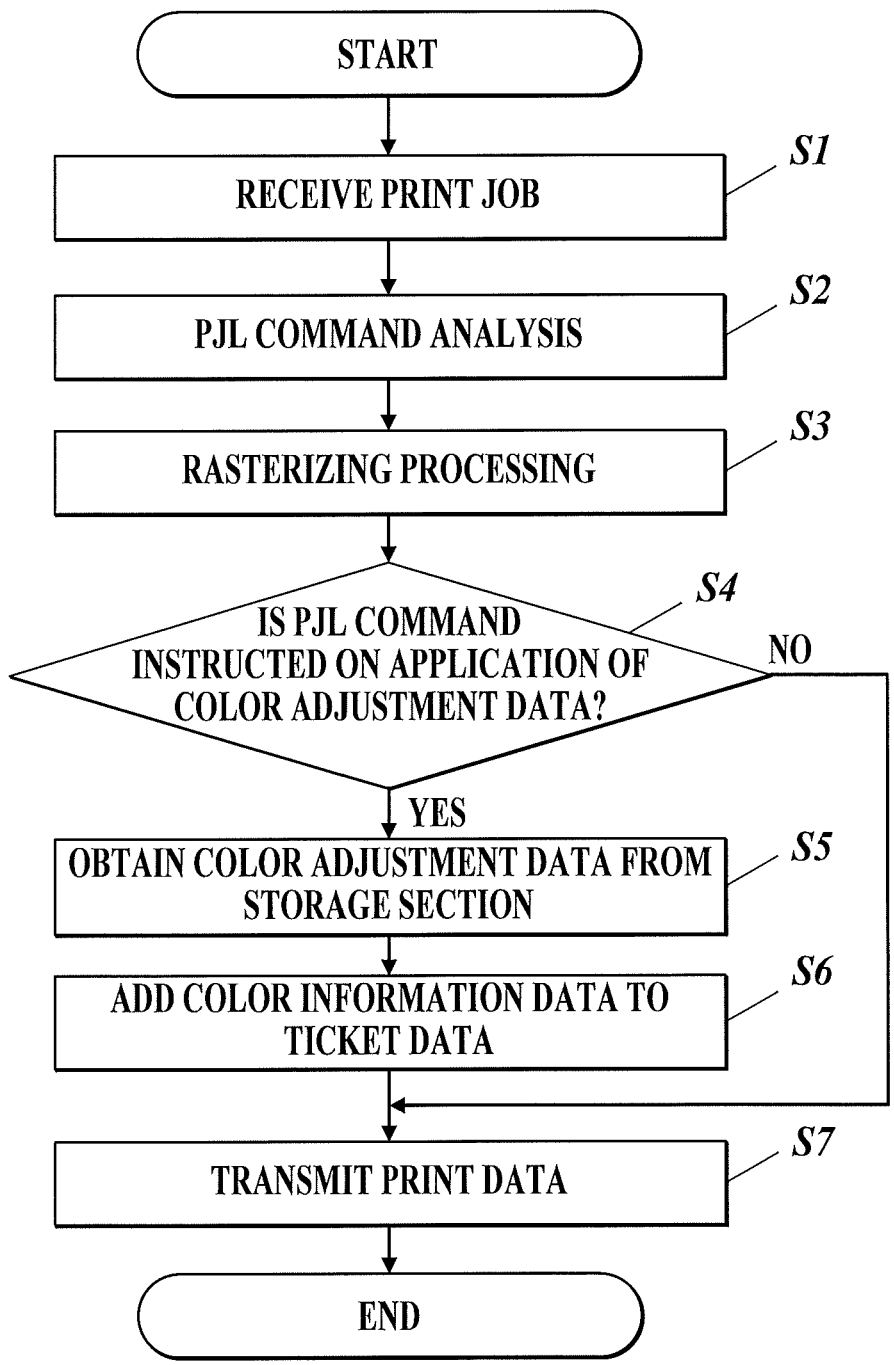
FIG. 7 is a flow chart showing the flow in the processing of a print controller subjected to an input of a print job.

FIG. 7 is a flow chart showing the flow in the processing of the print controller 2 subjected to the input of a print job.

The print controller 2 first receives a print job (Step S1). The control section 21 of the print controller 2 next performs the analysis of the PJL command included in the print job received at Step S1 (Step S2) and rasterizing processing based on the analysis of the PDL included in the print job to generate image data (Step S3). The order of the execution of the processing at Steps S2 and S3 is not particularly determined, and the processing at Steps S2 and S3 may be performed in the reverse order shown in the flow chart of FIG. 7.

The control section 21 next judges whether the PJL command includes therein the instruction of the application of the color adjustment data or not (Step S4). When the instruction of the application of the color adjustment data is included in the PJL command (Step S4: YES), the control section 21 reads the color adjustment data from the storage section 22 to obtain the read color adjustment data (Step S5), and adds the color adjustment data obtained at Step S5 to the ticket data (Step S6) to output the ticket data and the image data generated at Step S3 as print data (Step S7). When no instruction of the application of the color adjustment data is included in the PJL command (Step S4: NO), the processing is shifted to that at Step S7.

Figure 8:
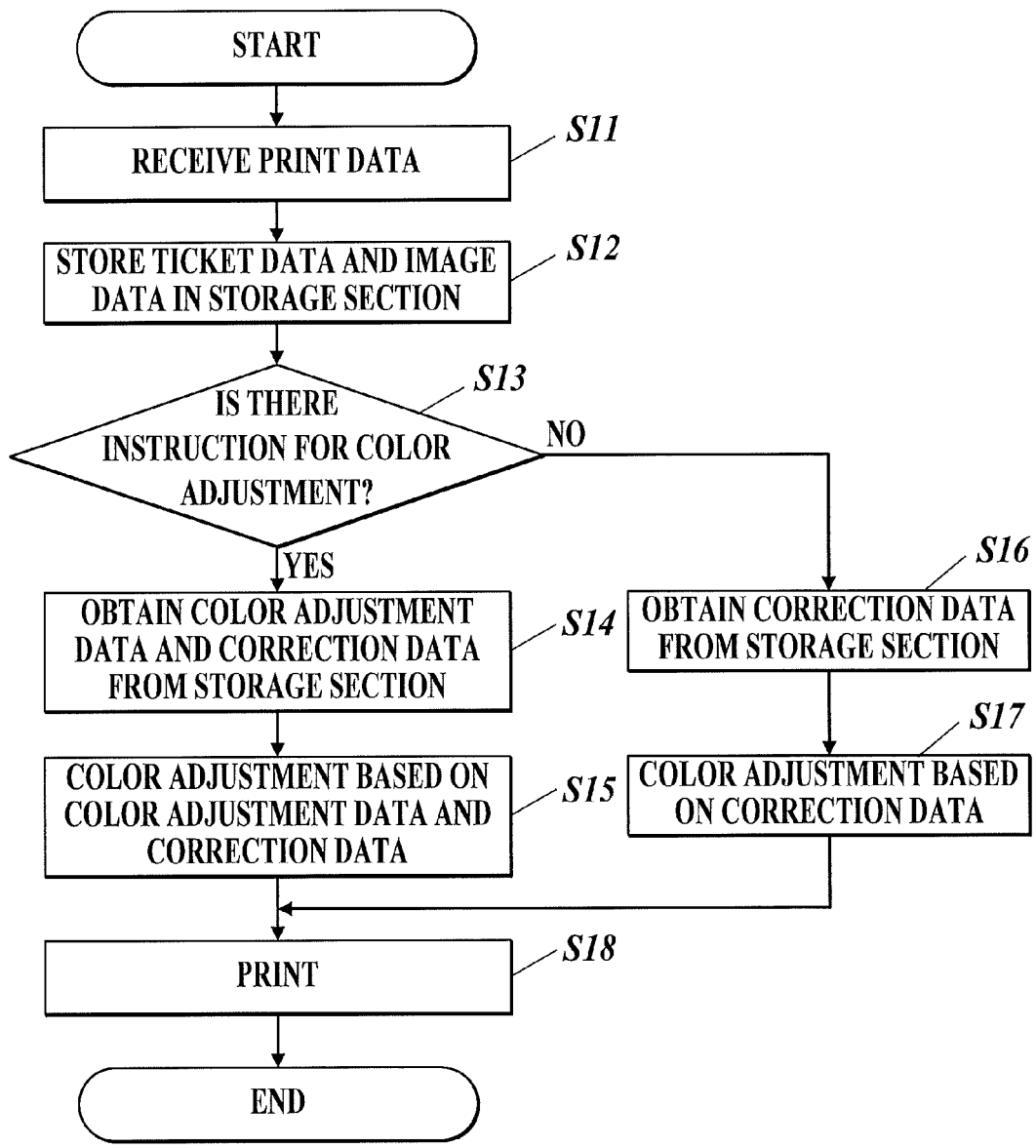
FIG. 8 is a flow chart showing the flow in the processing of a print engine subjected to the input of print data.

FIG. 8 is a flow chart showing the flow in the processing of the print engine 3 subjected to the input of the print data.

The print engine 3 first receives the print data (Step S11). The control section 31 of the print engine 3 next makes the storage section 32 store the ticket data and image data of the print data received at Step S11 (Step S12). The control section 31 then judges whether there is the instruction of color adjustment in the ticket data or not (Step S13).

When there is the instruction of the color adjustment in the ticket data (Step S13: YES), the adjustment section 33 reads the color adjustment data added to the ticket data and correction data from the storage section 32 to obtain the read color adjustment data and the correction data (Step S14), and performs the color adjustment of the image data on the basis of the color adjustment data and correction data obtained at Step S14 (Step S15).

When there are no instructions of the color adjustments in the ticket data (Step S13: NO), the adjustment section 33 reads the correction data from the storage section 32 to obtain read correction data (Step S16), and performs the color adjustment of the image data on the basis of the correction data obtained at Step S16 (Step S17).

After the processing at Step S15 or Step S17, the image data subjected to the color adjustment is output to the image forming section 34, and the image forming section 34 having received the input of the image data prints the image data (Step S18).

Figure 9:
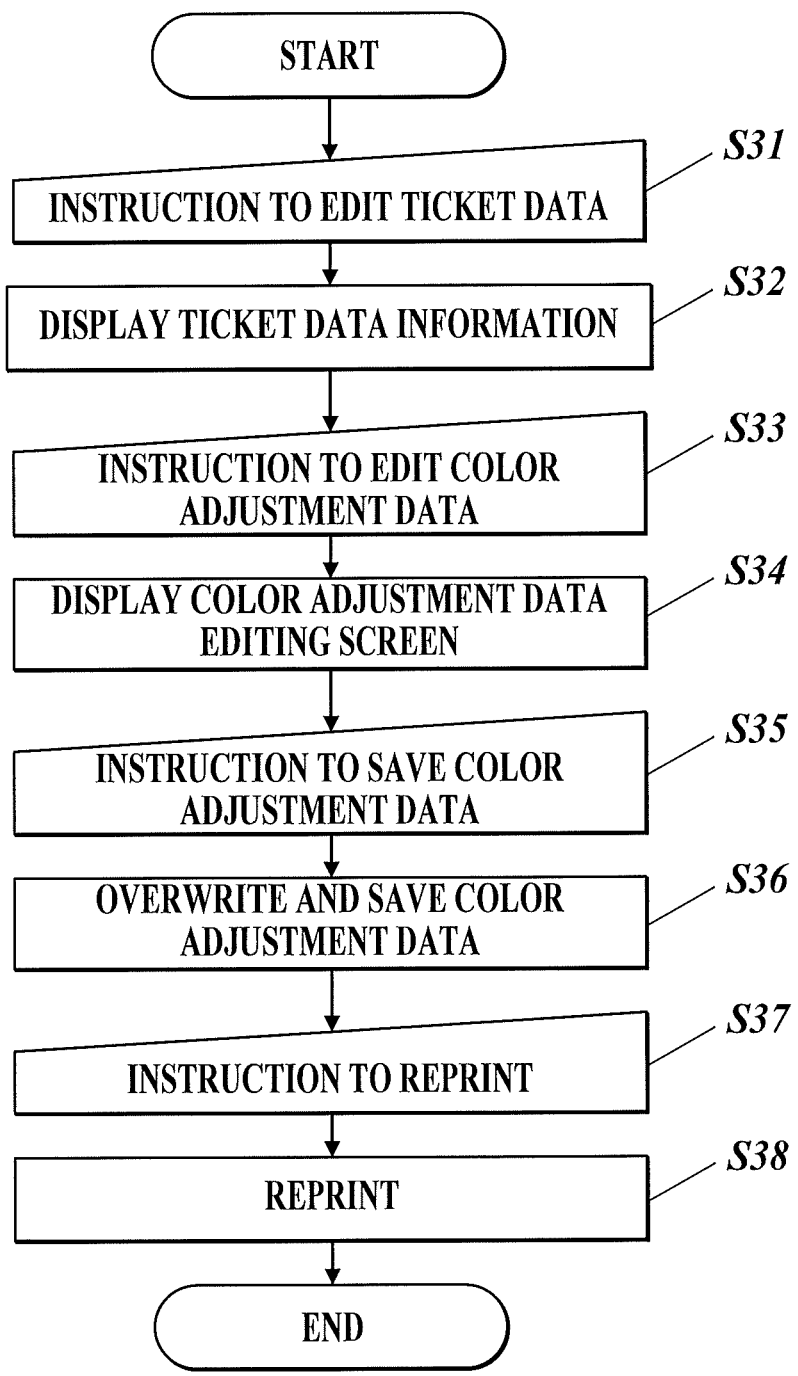
FIG. 9 is a flow chart showing the flow of the reediting and reprinting of color adjustment data by the print engine.

FIG. 9 is a flow chart showing the flow of the reediting and reprinting of the color adjustment data by the print engine 3.

When a ticket data editing instruction is given through the operation panel 36 (Step S31), the control section 31 makes the operation panel 36 display the ticket data information (Step S32). After that, when an editing instruction of color adjustment data is given (Step S33), that is, when a selection input operation of the ticket data including the color adjustment data of the editing object from the ticket data displayed on the operation panel 36; and a selection input operation of color adjustment data of the editing object are performed, the control section 31 makes the operation panel 36 display a color adjustment data editing screen in the state where the color adjustment data of the editing object is displayed in the color adjustment data displaying section 111 (Step S34).

When a saving instruction of the color adjustment data is given by an input operation of the OK button 115 on the color adjustment data editing screen displayed at Step S34 (Step S35), the control section 31 performs the overwriting and the saving of the color adjustment data of the editing object (Step S36).

After that, when an instruction input operation of reprinting is performed through the operation panel 36 (Step S37), the adjustment section 33 performs the color adjustment of the image data related to the ticket data to which the edited color adjustment data is added, on the basis of the edited color adjustment data and correction data, and outputs the image data after the color adjustment to the image forming section 34. Then, the image forming section 34 performs the reprinting of printing the input image data (Step S38).

Incidentally, as for the embodiments of the present invention, the embodiment disclosed above should be considered to be exemplified in all respects thereof and not to be restrictive. The scope of the present invention is not shown by the description above, but is shown by claims, and the all changes within the scope of claims and the equivalent thereof are intended to be included as the scope of the present invention.

For example, the image processing system of the present invention may add a plurality of pieces of color adjustment data to a piece of image data.

FIG. 10 is a diagram showing an example of the configuration of ticket data to which a plurality of pieces of color adjustment data is added.

As shown in FIG. 10, the plurality of pieces of color adjustment data may be added to the ticket data. The addition of the plurality of pieces of color adjustment data to the ticket data may also be used for the case of applying any one piece of the plurality of color adjustment data to the image data, besides the case of applying the individual color adjustment data to each page as shown in FIG. 5.

Figure 11:
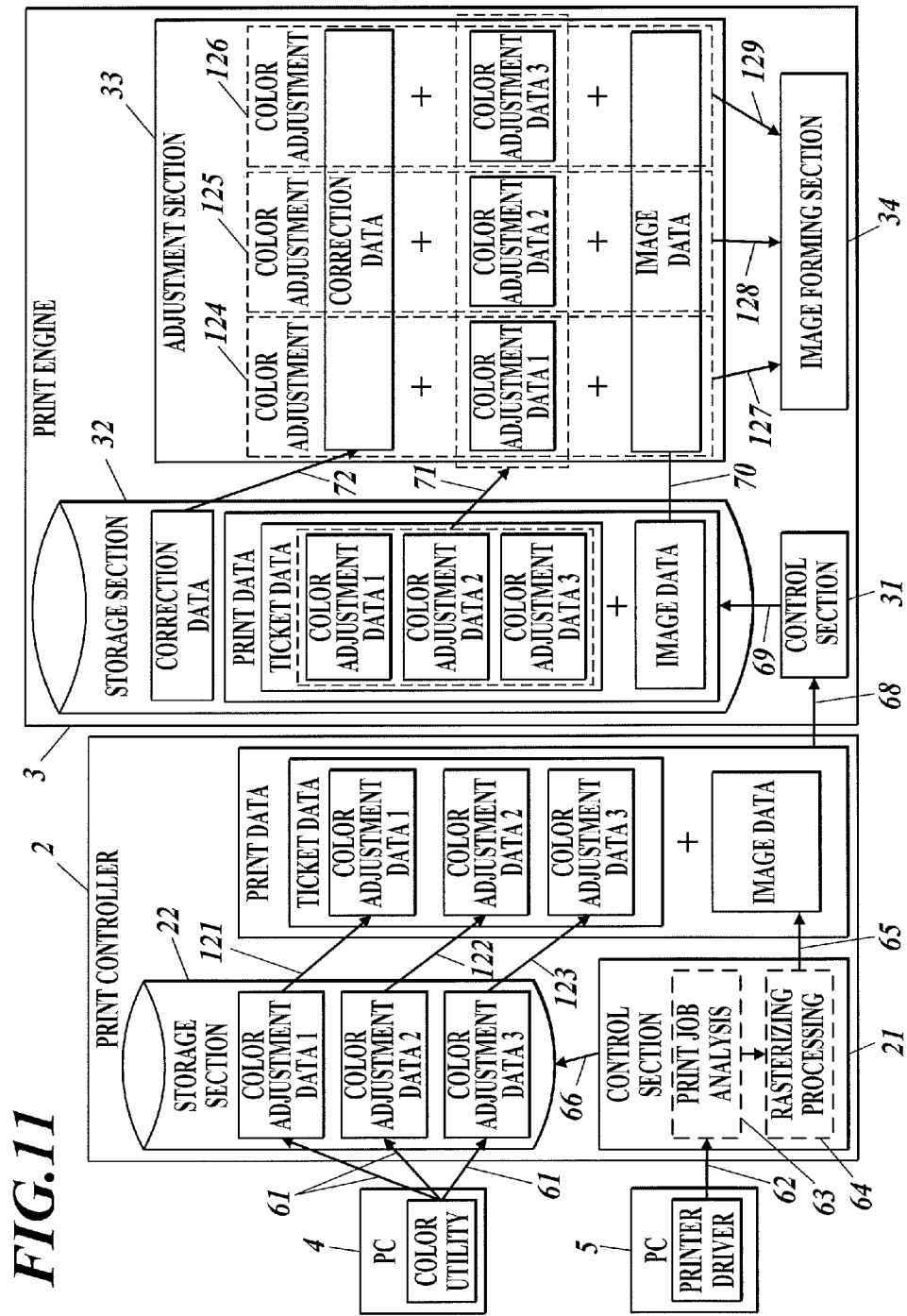
FIG. 11 is an explanatory diagram showing an example of an embodiment of an image processing system in which a plurality of pieces of color adjustment data are applied to image data.
Figure 12:
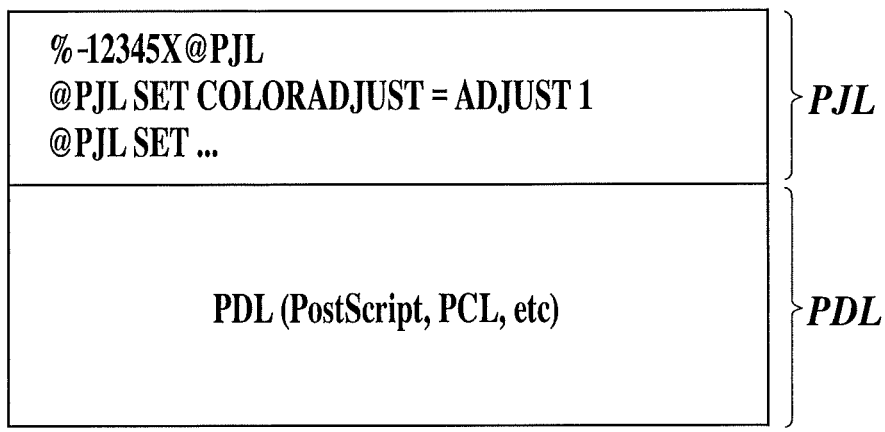
FIG. 12 is an explanatory diagram showing an example of the configuration of a print job.

FIG. 11 is an explanatory diagram showing an example of an embodiment of an image processing system in which a plurality of pieces of color adjustment data is applied to image data. The components similar to those of the embodiment described above are denoted by the marks same as those in the embodiment described above, and the descriptions thereof are omitted in FIG. 11 and in the following descriptions.

In the processing, executed by the control section 21 of the print controller 2, of reading the color adjustment data specified by a PJL command to add the read color adjustment data to the ticket data of the print job, the control section 21 reads a plurality of pieces of color adjustment data for image data and adds the plurality of pieces of color adjustment data to the ticket data (arrows 121, 122, and 123 in FIG. 11). The plurality of pieces of color adjustment data added at this time is not the color adjustment data to be applied to each page individually, but is the plurality of pieces of color adjustment data to be applied to the image data on the same page individually.

Then, the print engine 3 individually performs the color adjustments of the image data to which each of the plurality of pieces of color adjustment data added to the ticket data is applied (blocks 124, 125, and 126 in FIG. 11), and individually outputs the image data after the color adjustment by each piece of color adjustment data to the image forming section 34 (arrows 127, 128, and 129 in FIG. 11). The image forming section 34 prints each piece of the image data input individually.

Incidentally, in the color adjustment of the image data to which each piece of the plurality of pieces of color adjustment data added to the ticket data is applied, the color adjustment by correction data is also performed individually.

That is, the image processing system 1 shown in FIG. 11 may individually obtain the printing results of the image data subjected to the color adjustments by each of the plurality of pieces of color adjustment data added to the ticket data. For example, as shown FIG. 11, when three pieces of color adjustment data is applied to the image data, three types of printing results of the image data to which one piece of color adjustment data among the three pieces of color adjustment data is applied can be obtained.

By adding a plurality of pieces of color adjustment data to one piece of image data, a user can obtain a plurality of printing results of the same image data subjected to the gamma adjustments based on the respective pieces of the plurality of pieces of color adjustment data at one time. That is, when it is desired to obtain a plurality of printing results of the same image different in the color reproduction after color adjustments, a user has only to input the print job once, without being required to input the print job a plurality of times.

It is also adoptable to add both of a plurality of pieces of color adjustment data which is individually applied to the image data on the same page and a plurality of pieces of color adjustment data which is individually applied to each page, to ticket data.

The colors to be the objects of gamma adjustments in the present invention are not limited to the C, M, Y, and K, but may be the colors in color reproduction in other color spaces. As the other color spaces, for example, a color space including only three colors of C, M, and Y; a color space including only K (black and white); a color space including red (R), green (G), and blue (B), and the like may be cited.

An input apparatus and a display apparatus may individually be provided in place of the operation panel 36.

Although the above description discloses an example of using a ROM as a computer-readable medium of the programs according to the present invention, the computer-readable medium is not limited to this example. As other computer-readable media, it is possible to apply a nonvolatile memory, such as a flash memory, and a portable type storing medium, such as a compact disk read only memory (CD-ROM). Moreover, as a medium to provide the data of the programs according to the present invention through a communication line, a carrier wave can also be applied to the present invention.

According to an aspect of the preferred embodiment of the present invention, provided is an image processing system, comprising:

an image processing apparatus to output image data based on an input of a print job; and an image forming apparatus to form an image based on the image data, wherein the image processing apparatus comprises a first control section to output color adjustment data so as to perform a gamma adjustment for the image data, and wherein the image forming apparatus comprises an adjustment section to perform the gamma adjustment for the image data based on the input color adjustment data.

According to the present embodiment, the control section 21 of the print controller 2 outputs color adjustment data to perform the gamma adjustment for image data to the print engine 3, and the adjustment section 33 of the print engine 3 performs the color adjustment of image data already subjected to rasterizing on the basis of the input color adjustment data to perform the printing on the basis of the image data after the color adjustment.

Consequently, when it is desired to change the gamma characteristic of an image at the time of performing reprinting, what is required for the print controller 2 is that the print controller 2 outputs only the color adjustment data to the print engine 3 to be subjected to a color adjustment of the image data on the basis of the input color adjustment data at the time of reprinting at the print engine 3 side. The color adjustment data is the data including the information pertaining to a gamma characteristic, and the data quantity thereof may be made to be extremely smaller than that of the image data of a bit map pattern or the like. Consequently, the traffic at the time of reprinting on the transfer path between the print controller and the print engine pertaining to the reprinting may be made to be extremely smaller in comparison with that of the conventional configuration, in which the image data subjected to a color adjustment is output at the time of reprinting. The transfer time between the print controller and the print engine pertaining to reprinting may hence be shortened, and the time cycle of the reprinting may considerably be improved.

Furthermore, because the gamma adjustment on the basis of color adjustment data is performed by the adjustment section 33 in the print engine 3, the print controller 2 does not apply any color adjustment data at the time of rasterizing processing. Consequently, even when changes in a gamma value arise at the time of reprinting, the print controller 2 is not required to perform rasterizing processing of a print job in which the change of the gamma value has arisen again. The load of the print controller 2 at the time of reprinting may hence be decreased considerably, and the resources of the print controller 2 may be assigned to the other processing, such as the rasterizing processing of another print job.

Furthermore, the image data to be input to the print engine 3 is the image data before color adjustment. That is, the image data input to the print engine 3 does not include any loss of tone information caused by the color adjustment data. Consequently, it is possible to apply the color adjustment data after editing to the image data before the color adjustment when the print engine 3 edits the color adjustment data to apply the edited color adjustment data to the image data. Thereby, the accuracy of color reproduction based on the original tone information may considerably be improved in comparison with that of the conventional configuration of further performing color adjustment to the image data after the color adjustment using color adjustment data.

As described above, the image processing system 1 of the present embodiment may decrease the consumption of the resources pertaining to reprinting and the lowering of the accuracy of color reproduction.

Preferably, the image forming apparatus further comprises a first storage section to store the image data and the color adjustment data, wherein when an image formation is performed by using: the same image data as the image data stored in the first storage section; and a gamma value different from a gamma value applied to a prior image formation, the first control section outputs new color adjustment data corresponding to the different gamma value, and wherein the adjustment section performs the gamma adjustment for the image data stored in the first storage section based on the new color adjustment data.

Furthermore, as the inquiry pertaining to the image data stored in the storage section 32 of the print engine 3, the control section 21 of the print controller 2 obtains the information of the image data and ticket data held by the print engine 3. Then, the control section 31 of the print engine 3 returns the information of the image data and ticket data stored in the storage section 32 to the print controller 2 in response to a request from the print controller 2. The image data stored in the print engine 3 through print controller 2 and the equipment connected to the print controller 2 may thereby be grasped, and reprinting may be performed in the state of grasping a print job which only requires the inputting of color adjustment data to the print engine 3 at the time of reprinting.

Preferably, the first control section performs an inquiry to the image forming apparatus pertaining to the image data, and wherein the image forming apparatus further comprises a second control section to provide information pertaining to the image data stored in the first storage section in response to the inquiry of the first control section.

Furthermore, as the inquiry pertaining to the image data stored in the storage section 32 of the print engine 3, the control section 21 of the print controller 2 obtains the information of the image data and ticket data held by the print engine 3. Then, the control section 31 of the print engine 3 returns the information of the image data and ticket data stored in the storage section 32 to the print controller 2 in response to a request from the print controller 2. The image data stored in the print engine 3 through print controller 2 and the equipment connected to the print controller 2 may thereby be grasped, and reprinting may be performed in the state of grasping a print job which only requires the inputting of color adjustment data to the print engine 3 at the time of reprinting.

Preferably, the first storage section stores correction data to perform the gamma adjustment for the image data, the correction data being different from the color adjustment data, and wherein the adjustment section performs the gamma adjustment for the image data based on the color adjustment data and the correction data.

Furthermore, the storage section 32 of the print engine 3 stores correction data, and the adjustment section 33 of the print engine 3 performs the color adjustment of image data on the basis of color adjustment data and the correction data. Consequently, it is possible to perform printing after correcting the features pertaining to the peculiar gamma characteristic included in the print engine 3 owing to the coloring of toner, and the like.

Preferably, the adjustment section performs an adjustment of the gamma value of the image data based on one of the color adjustment data and the correction data, and the adjustment section subsequently performs the gamma adjustment, based on the other one of the color adjustment data and the correction data, for the image data having been subjected to the adjustment of the gamma value based on one of the color adjustment data and the correction data.

Furthermore, the adjustment section 33 of the print engine 3 may perform color adjustment of image data on the basis of either color adjustment data or correction data before performing the color adjustment of the image data having been performed with the gamma adjustment by the used data, on the basis of the other unused data. Thereby, because the adjustment section 33 may perform the color adjustments of image data based on both the color adjustment data and the correction data by repeating the color adjustment processing, it is unnecessary to provide any special configurations to the print engine 3 in order to perform the color adjustments of image data based on both the color adjustment data and the correction data.

Preferably, the second control section generates a piece of data to perform an adjustment of the gamma value based on both the color adjustment data and the correction data, and wherein the adjustment section performs the gamma adjustment for the image data based on the generated piece of data.

Furthermore, the control section 31 of the print engine 3 may generate a piece of data to perform the gamma adjustments based on both the color adjustment data and the correction data, and the adjustment section 33 may perform a color adjustment of image data on the basis of the generated piece of data. At this time, the control section 31 generates a color adjustment table, and the adjustment section 33 performs the color adjustment of the image data on the basis of the color adjustment table. Consequently, the load of the processing pertaining to the color adjustment of the image data may be dispersed.

Preferably, the first control section outputs a plurality of pieces of color adjustment data for one piece of the image data, and wherein the adjustment section performs the gamma adjustment for the image data based on each of the plurality of pieces of color adjustment data.

Thereby, when a plurality of candidates of the gamma conversion table to perform a color adjustment at the time of printing an image is produced, a user is not required to input the print job a plurality of times, and it is possible to check a plurality of printing results using the respective candidates of all the gamma conversion tables by a single operation, and to select the best printing result.

Preferably, the image forming apparatus further comprises a color adjustment data editing section to perform an editing of the color adjustment data, and wherein the adjustment section performs the gamma adjustment for the image data based on the color adjustment data edited by the color adjustment data editing section.

Furthermore, the print engine 3 is provided with the operation panel 36 capable of editing the color adjustment data of ticket data stored in the storage section 32, and the adjustment section 33 performs a color adjustment of image data on the basis of the color adjustment data edited with the operation panel 36. Thereby, the print engine 3 may perform the gamma adjustment of the image to be printed on its own without being provided with any aid of the other equipment, such as the print controller 2 and the PC 5.

What is claimed is:

1. An image processing system, comprising:
    an image processing apparatus to output image data based on an input of a print job, wherein the image processing apparatus comprises a first control section to output color adjustment data so as to perform a gamma adjustment for the image data;
    an image forming apparatus to form an image based on the image data, wherein the image forming apparatus comprises an adjustment section to perform the gamma adjustment for the image data based on the color adjustment data; and
    a first storage section to store the image data and the color adjustment data,
    wherein when an image formation is performed by using: the same image data as the image data stored in the first storage section; and a gamma value different from a gamma value applied to a prior image formation, the first control section outputs new color adjustment data corresponding to the different gamma value, and
    wherein the adjustment section performs the gamma adjustment for the image data stored in the first storage section based on the new color adjustment data.

2. The image processing system as claimed in claim 1, wherein the first control section performs an inquiry to the image forming apparatus pertaining to the image data, and
    wherein the image forming apparatus further comprises a second control section to provide information pertaining to the image data stored in the first storage section in response to the inquiry of the first control section.

3. The image processing system as claimed in claim 2, wherein the first storage section stores correction data to perform the gamma adjustment for the image data, the correction data being different from the color adjustment data, and
    wherein the adjustment section performs the gamma adjustment for the image data based on the color adjustment data and the correction data.

4. The image processing system as claimed in claim 3, wherein the adjustment section performs an adjustment of the gamma value of the image data based on one of the color adjustment data and the correction data, and the adjustment section subsequently performs the gamma adjustment, based on the other one of the color adjustment data and the correction data, for the image data having been subjected to the adjustment of the gamma value based on one of the color adjustment data and the correction data.

5. The image processing system as claimed in claim 3, wherein the second control section generates a piece of data to perform an adjustment of the gamma value based on both the color adjustment data and the correction data, and
    wherein the adjustment section performs the gamma adjustment for the image data based on the generated piece of data.

6. The image processing system as claimed in claim 1, wherein the first control section outputs a plurality of pieces of color adjustment data for one piece of the image data, and
    wherein the adjustment section performs the gamma adjustment for the image data based on each of the plurality of pieces of color adjustment data.

7. The image processing system as claimed in claim 1, wherein the image forming apparatus further comprises a color adjustment data editing section to perform an editing of the color adjustment data, and
    wherein the adjustment section performs the gamma adjustment for the image data based on the color adjustment data edited by the color adjustment data editing section.

8. An image processing apparatus to generate image data based on an input of a print job so as to output the generated image data to an image forming apparatus, comprising:
    an output section to output data to the image forming apparatus; and
    a control section to output, through the output section, color adjustment data so as to perform a gamma adjustment for the image data,
    wherein when an image formation is performed by using: the same image data as the image data stored in a first storage section of the image forming apparatus; and a gamma value different from a gamma value applied to a prior image formation, the control section outputs new color adjustment data corresponding to the different gamma value.

9. The image processing apparatus as claimed in claim 8, wherein the control section performs an inquiry to the image forming apparatus pertaining to the image data.

10. The image processing apparatus as claimed in claim 8, wherein the control section outputs a plurality of pieces of color adjustment data for one piece of the image data.

11. An image forming apparatus to form an image based on image data input from an image processing apparatus, comprising:
    an input section to input data from the image processing apparatus;
    an adjustment section to perform a gamma adjustment for the image data based on color adjustment data for performing the gamma adjustment for the image data input from the input section; and
    a first storage section to store the image data and the color adjustment data, and
    wherein when the same image data as the image data stored in the first storage section is used, and when new color adjustment data corresponding to a gamma value different from a gamma value applied to a prior image formation is input, the adjustment section performs the gamma adjustment for the image data stored in the first storage section based on the new color adjustment data.

12. The image forming apparatus as claimed in claim 11, further comprising a control section to provide information pertaining to the image data stored in the first storage section in response to an inquiry pertaining to the image data stored in the first storage section.

13. The image forming apparatus as claimed in claim 12, wherein the storage section stores correction data to perform the gamma adjustment for the image data, the correction data being different from the color adjustment data, and
    wherein the adjustment section performs the gamma adjustment for the image data based on the color adjustment data and the correction data.

14. The image forming apparatus as claimed in claim 13, wherein the adjustment section performs an adjustment of the gamma value of the image data based on one of the color adjustment data and the correction data, and the adjustment section subsequently performs the gamma adjustment, based on the other one of the color adjustment data and the correction data, for the image data having been subjected to the adjustment of the gamma value based on one of the color adjustment data and the correction data.

15. The image forming apparatus as claimed in claim 13, wherein the control section generates a piece of data to perform an adjustment of the gamma value based on both the color adjustment data and the correction data, and
    wherein the adjustment section performs the gamma adjustment for the image data based on the generated piece of data.

16. The image forming apparatus as claimed in claim 11, wherein the adjustment section performs the gamma adjustment for the image data based on each of a plurality of pieces of color adjustment data for a piece of the image data.

17. The image forming apparatus as claimed in claim 11, further comprising:
    a color adjustment data editing section to perform an editing of the color adjustment data,
    wherein the adjustment section performs the gamma adjustment for the image data based on the color adjustment data edited by the color adjustment data editing section.

18. A non-transitory computer-readable storage medium to store a program so as to make a computer of an image processing apparatus which generates image data based on an input of a print job to output the generated image data to an image forming apparatus, function as an output section to output color adjustment data to perform a gamma adjustment for the image data
    wherein when an image formation is performed by using: the same image data as the image data stored in a first storage section of the image forming apparatus; and a gamma value different from a gamma value applied to a prior image formation, the output section outputs new color adjustment data corresponding to the different gamma value.

19. A non-transitory computer-readable storage medium to store a program so as to make a computer of an image forming apparatus which forms an image based on image data input from an image processing apparatus, function as an adjustment section to perform a gamma adjustment for the image data based on color adjustment data for performing the gamma adjustment for the image data, and
    to store the image data and the color adjustment data in a first storage section of the image forming apparatus, and
    wherein when the same image data as the image data stored in the first storage section is used, and when new color adjustment data corresponding to a gamma value different from a gamma value applied to a prior image formation is input, the adjustment section performs the gamma adjustment for the image data stored in the first storage section based on the new color adjustment data.

* * * * *